(12) United States Patent
Kelso et al.

(10) Patent No.: US 7,197,406 B2
(45) Date of Patent: Mar. 27, 2007

(54) APPARATUS, SYSTEM, AND METHOD FOR IDENTIFYING STRUCTURAL STRESS CONDITIONS FOR COMPUTER HARDWARE

(75) Inventors: Scott Edwards Kelso, Durham, NC (US); John Carl Mese, Cary, NC (US); Nathan J. Peterson, Raleigh, NC (US); Rod David Waltermann, Rougemont, NC (US); Arnold S. Weksler, Raleigh, NC (US)

(73) Assignee: Lenovo (Singapore) Pte. Ltd, Singapore (SG)

( * ) Notice: Subject to any disclaimer, the term of this patent is extended or adjusted under 35 U.S.C. 154(b) by 24 days.

(21) Appl. No.: 11/156,688

(22) Filed: Jun. 20, 2005

(65) Prior Publication Data

US 2006/0287972 A1 Dec. 21, 2006

(51) Int. Cl.
*G06F 19/00* (2006.01)

(52) U.S. Cl. .......................... 702/42; 701/25

(58) Field of Classification Search ............. 702/42, 702/182, 183–185, 188, 33, 35, 138, 145, 702/176, 177; 714/25; 701/31, 32, 35
See application file for complete search history.

(56) References Cited

U.S. PATENT DOCUMENTS

| | | | |
|---|---|---|---|
| 4,558,757 A | 12/1985 | Mori et al. | 178/18 |
| 5,526,208 A | 6/1996 | Hatch et al. | 360/109 |
| 5,541,372 A | 7/1996 | Baller et al. | 178/20 |
| 6,731,505 B1 | 5/2004 | Goodwin et al. | 361/719 |
| 6,760,649 B2 | 7/2004 | Cohen | 700/299 |
| 2004/0145577 A1 | 7/2004 | Yajima et al. | 345/173 |
| 2005/0075846 A1* | 4/2005 | Kim | 703/1 |

FOREIGN PATENT DOCUMENTS

| | | |
|---|---|---|
| DE | 19811935 A1 | 9/1999 |
| JP | 8043425 A | 2/1996 |
| JP | 2000162231 A | 11/1998 |

OTHER PUBLICATIONS

"How to Use a PC to Measure Strain" http://www.windmill.co.uk/monitor17.html.

* cited by examiner

*Primary Examiner*—Edward Raymond
(74) *Attorney, Agent, or Firm*—Kunzter & McKenzie

(57) ABSTRACT

An apparatus, system, and method are disclosed for identifying structural stress conditions for computer hardware. The apparatus includes a plurality of modules configured to functionally execute the necessary steps of monitoring a physical condition affecting a computer hardware component, recognizing a potential damage condition based on a threshold, and responding to the potential damage condition. These modules in the described embodiments include a monitoring module, a recognition module, and a response module. Beneficially, such an apparatus, system, and method would identify potential damage conditions and alert a user to the potential damage condition before physical damage to the computer hardware component occurs. The user can then alleviate the physical condition affecting the computer component and avoid component damage.

23 Claims, 7 Drawing Sheets

APPARATUS, SYSTEM, AND METHOD FOR IDENTIFYING STRUCTURAL STRESS CONDITIONS FOR COMPUTER HARDWARE

BACKGROUND OF THE INVENTION

1. Field of the Invention

This invention relates to computer hardware and more particularly relates to identifying structural stress conditions for computer hardware.

2. Description of the Related Art

Several different sensors have been developed to facilitate measurement of physical stress conditions. One such sensor is a strain gauge. When a force is applied to a structure, the length of the structure changes. Strain is a measurement of the change in length of the structure. A strain gauge often contains conductive material. As the length of the gauge changes, the resistance of the conductive material changes. This change in resistance can be measured and calibrated to provide useful information on the amount of strain the component to which the gauge is attached is experiencing. Other sensors function similarly to provide useful information about other specific physical stress conditions.

Computer hardware components are often sensitive to their physical environment. For example, slight increases in temperature may dramatically impact integrated circuit performance, and in some cases may irreparably damage the circuit. Liquid Crystal Display (LCD) screens used in laptop computers may be highly sensitive to external pressure. In some cases, force exerted on an LCD screen may crack or shatter the screen or components of the screen. If a torsion force is applied to the chassis of a computer, electrical contacts, wire harnesses, and other components within the chassis may be damaged. In such cases, damage may be avoided if the physical stress condition affecting the component is alleviated.

From the foregoing discussion, it should be apparent that a need exists for an apparatus, system, and method that identify structural stress conditions for computer hardware. Beneficially, such an apparatus, system, and method would identify a potential damage condition and alert a user to the potential damage condition before physical damage occurs to the computer hardware component. The user can then alleviate the physical stress condition affecting the computer component and avoid component damage.

SUMMARY OF THE INVENTION

The present invention has been developed in response to the present state of the art, and in particular, in response to the problems and needs in the art that have not yet been fully solved by currently available computer hardware. Accordingly, the present invention has been developed to provide an apparatus, system, and method for identifying structural stress conditions for computer hardware that overcome many or all of the above-discussed shortcomings in the art.

The apparatus for identifying structural stress conditions for computer hardware is provided with a logic unit containing a plurality of modules configured to functionally execute the necessary steps of monitoring a physical stress condition affecting a computer hardware component, recognizing a potential damage condition based on a threshold, and responding to the potential damage condition. These modules in the described embodiments include a monitoring module, a recognition module, and a response module.

The apparatus, in one embodiment, is configured to monitor a signal from a sensor selected from a group consisting of a pressure sensor, a stress sensor, a strain gauge, a torsion sensor, a puncture sensor, an angle sensor, an accelerometer, a temperature sensor, and a humidity sensor. Additionally, the apparatus may be configured to monitor a signal from a pressure-sensitive pointer control device. In another embodiment, the monitor module is further configured to monitor a plurality of sensor signals. In one embodiment, the recognition module may further comprise a disable module configured to temporarily disable the response module.

In one embodiment, the response module may further comprise an alert module configured to alert a user to the potential damage condition. Additionally, the response module may include a logging module configured to store damage condition information. The response module may be further configured to store potential damage information in nonvolatile memory. In another embodiment, the response module may comprise a communication module configured to communicate damage condition information to a remote device.

In one embodiment, the apparatus for identifying structural stress conditions for computer hardware is provided with a logic unit containing a plurality of modules configured to functionally execute the necessary steps of monitoring a strain gauge coupled to a computer hardware component, recognizing a potential damage condition based on a threshold, and generate at least one response to the potential damage condition, wherein the response is selected from a group consisting of initiating a user-perceivable alert, logging damage condition information, and remotely communicating damage condition information. These modules in the described embodiments include a monitoring module, a recognition module, and a response module.

A system of the present invention is also presented for identifying structural stress conditions for computer hardware. The system may include a portable computing device configured with a computer hardware component to be monitored, a sensor configured to sense a physical stress condition affecting the computer hardware component, and a processor configured to monitor a physical stress condition affecting a computer hardware component, recognize a potential damage condition based on a threshold, and respond to the potential damage condition.

In certain embodiments, the processor may comprise modules substantially similar to the modules of the apparatus described above. The processor may additionally be configured to communicate damage condition information to a remote data repository.

A method of the present invention is also presented for monitoring a physical stress condition affecting a computer hardware component, recognizing a potential damage condition based on a threshold, and responding to the potential damage condition. The method in the disclosed embodiments substantially includes the steps necessary to carry out the functions presented above with respect to the operation of the described apparatus and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
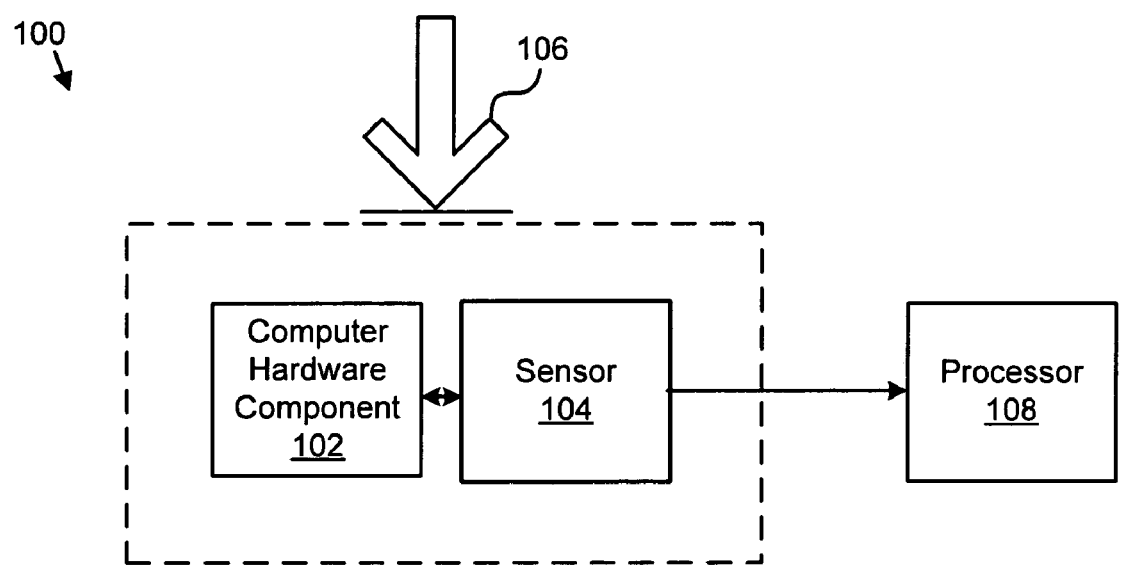
FIG. 1 is a schematic block diagram illustrating one embodiment of a system for identifying structural stress conditions for computer hardware.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, the term "physical stress condition" refers to a force level, stress, temperature level, humidity level or pressure level that imposes physical stress, strain, or endangerment on a computer hardware component. As used herein, the term "potential damage condition" refers to a physical stress condition that is measurable by a sensor, and may potentially damage or destroy a computer hardware component.

FIG. 1 depicts a system 100 for identifying structural stress conditions for computer hardware. In one embodiment, the system 100 includes a computer hardware component 102 to be monitored, a sensor 104 configured to sense a physical stress condition 106 affecting the computer hardware component 102. The system 100 also includes a processor 108 configured to monitor the physical stress condition 106 affecting the computer hardware component 102, recognize a potential damage condition based on a threshold, and respond to the potential damage condition. Preferably, the response generated by the processor induces a user to alleviate the physical stress condition 106 creating the potential damage condition, thereby protecting the computer hardware component.

In one embodiment, the system 100 includes a computer hardware component 102 to be monitored. Various types of computer hardware components 102 may be monitored. Specifically, the system 100 may monitor a computer hardware component 102 that is sensitive to a particular physical stress condition 106. Computer hardware components 102 that are susceptible to damage from temperature, structural stress, compression or torsion force, and the like may be protected by the system 100. For example, a computer processor may be sensitive to heat, an LCD screen may be sensitive to torsion or compression force, and certain computer hardware components 102 may be sensitive to excess moisture or humidity.

In one embodiment, the system 100 may include a sensor 104. The sensor 104 may be coupled to the computer hardware component 102 by an adhesive or other fastener. In certain other embodiments, the sensor 104 may be positioned near the hardware component 102 or on components connected to the hardware component 102 to provide early warning of a potential damage condition. For example, the sensor 104 may comprise a strain gauge 104 coupled to a laptop outer cover to sense compression strain on the outer cover. However, the computer hardware component 102 to be monitored may be the LCD screen. In such an example, the strain gauge 104 may identify early warning signs that a potential damage condition exists by monitoring the stress on the outer cover, without directly exposing the LCD screen to the potential damage condition. In another example, a strain gauge 104 or other sensor 104 may be coupled directly to the LCD screen, or other computer hardware component 102 to be monitored.

The system 100 may include various types of sensors 104. For example, the sensor 104 may include a pressure sensor, a stress sensor, a strain gauge, a torsion sensor, a puncture sensor, an angle sensor, an accelerometer, a temperature sensor, a humidity sensor, or the like. Typically, these sensors 104, and methods for manufacturing the sensors 104, are known to one of ordinary skill in the art. However, when properly placed with relation to the computer hardware component 102 to be monitored and utilized in combination with logic executed by the processor 108, the sensor 104 provides a unique and novel system 100 for identifying structural stress conditions for computer hardware.

In one embodiment, the processor 108 monitors a physical stress condition 106 affecting the computer hardware component 102, recognizes a potential damage condition based on a threshold, and responds to the potential damage condition. In certain embodiments, the processor 108 monitors the physical stress condition 106 by monitoring signals from one or more sensors 104 positioned to sense the physical stress condition 106 affecting the computer hardware component 102. In one embodiment, the processor 108 may monitor multiple sensors 104 substantially simultaneously.

In one embodiment, the processor 108 compares the value of the physical stress condition 106 measured by the sensor 104 to a threshold to recognize a potential damage condition. A potential damage condition is a physical stress condition that is measurable by a sensor, and may potentially damage or destroy the computer hardware component 102.

In one embodiment, the processor 108 is continuously powered for continuous monitoring of the physical stress condition 106. For example, the processor 108 may be a Hitachi H8□ continuously powered processor. The processor 108 may draw power from a dedicated processor battery, directly from a primary laptop battery, or other power sources commonly known in the art.

In certain embodiments, the processor 108 is configured to store damage condition information in nonvolatile memory. For example, the processor 108 may store damage condition information in Programmable Read-Only Memory (PROM). In another embodiment, the processor 108 may store damage condition information in a continuously powered Random Access Memory (RAM). In other embodiments, the nonvolatile memory may include a hard disk, solid state flash memory, and the like.

In another embodiment, the processor 108 may communicate damage condition information to a remote data repository. For example, the processor may communicate with a central data repository via an Internet connection, telephone connection, wireless connection, point to point connection, and the like. In certain embodiments, the remote data repository may include a database. The database may be stored on one or more magnetic disk drives, magnetic tape drives, optical drives, or the like. In one embodiment, the damage condition information may include the physical stress condition 106 level measured by the sensor 104, the duration of the damage condition, a time stamp, a record of alert actions taken, and the like. The damage condition information may be useful for evaluating warranty claims.

Figure 2:
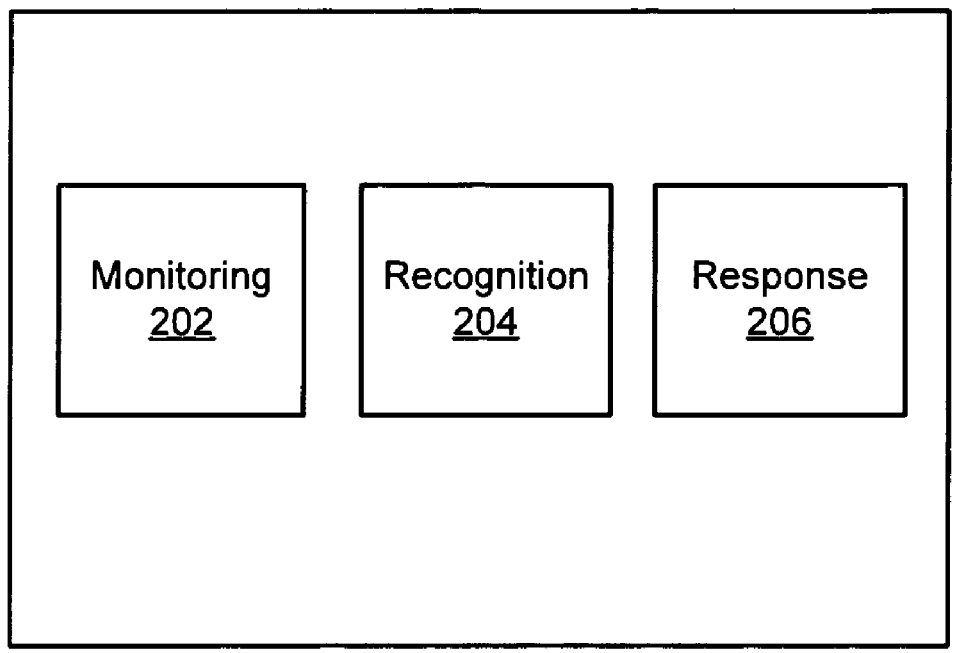
FIG. 2 is a schematic block diagram illustrating one embodiment of an apparatus for identifying structural stress conditions for computer hardware.

FIG. 2 illustrates one embodiment of an apparatus 200 for identifying structural stress conditions for computer hardware. In one embodiment, the apparatus 200 includes a monitoring module 202, a recognition module 204, and a response module 206. In one embodiment, the apparatus 200 may perform substantially the same functions as the processor 108 described with relation to FIG. 1 above.

In one embodiment, the monitoring module 202 is configured to monitor a physical stress condition 106 affecting a computer hardware component 102. The monitoring module 202 may include one or more sensor interface ports. In one embodiment, the sensor interface ports are wired hardware interface ports. Alternatively, the sensor interface ports may be software defined. The monitoring module 202 may continuously monitor a signal generated by the sensor 104. Alternatively, the monitoring module 202 may periodically check the signal level. If multiple sensors 104 are monitored by the monitoring module 202, the sensor signals may be continuously monitored simultaneously. Alternatively, the sensor signals may be monitored cyclically. In certain embodiments, the monitoring module 202 may calibrate or normalize the sensor signal levels according to hardware or software requirements for further utilization of sensor information.

In one embodiment, the recognition module 204 recognizes a potential damage condition based on a threshold. The threshold may be software defined. For example, the recognition module 204 may include computer code programmed to compare the monitored sensor signal level with a predefined threshold level. In another embodiment, the threshold may be hardware defined. For example, the sensor signal level may be compared with a threshold in a comparator circuit commonly known in the art. In certain embodiments, the threshold may be adjusted based on user inputs. For example, a user may adjust an adjustable potentiometer component of a comparator circuit. Alternatively, the user may change the threshold using a graphical user interface (GUI), command line interface, or other user-computer interface. A potential damage condition is recognized when the sensor signal level crosses the threshold.

In one embodiment, the response module 206 responds to the potential damage condition. In various embodiments, the response may include a user alert, local storage of damage condition information, and communication of damage condition information. For example, the response module 206 may trigger an audible alarm to alert a user to the potential damage condition. The user may then alleviate the potential damage condition. Additionally, the response module 206 may communicate the potential damage condition to a remote device.

Figure 3:
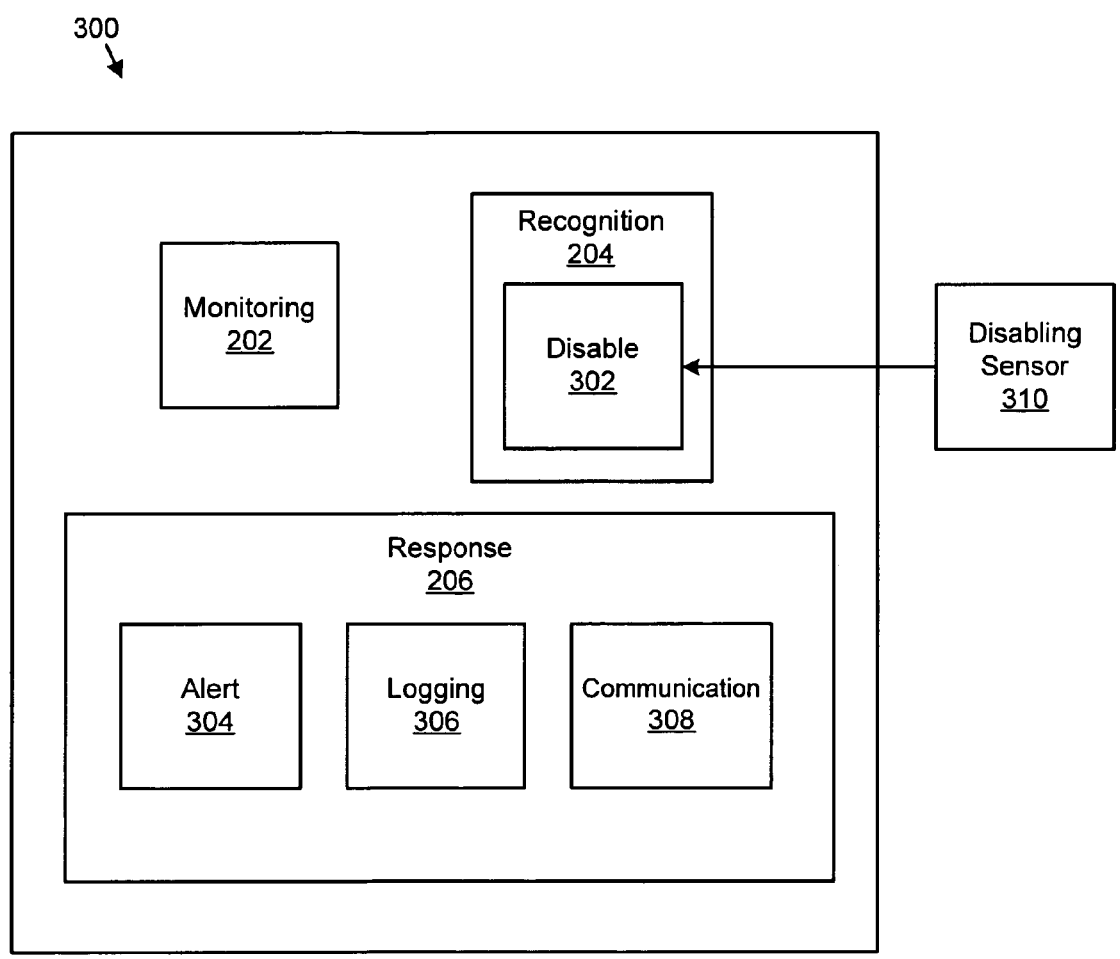
FIG. 3 is a detailed schematic block diagram illustrating one embodiment of an apparatus for identifying structural stress conditions for computer hardware.

FIG. 3 is a detailed schematic block diagram illustrating one embodiment of an apparatus 300 for identifying structural stress conditions for computer hardware. In one embodiment, the apparatus 300 includes a monitoring module 202, a recognition module 204, and a response module 206 as describe in relation to FIG. 2. Additionally, the recognition module 204 may include a disable module 302. In one embodiment, the response module 206 may include an alert module 304, a logging module 306, and a communication module 308.

In one embodiment, the disable module 302 is configured to temporarily disable the response module 206. For example, if the disable module 302 recognizes a signal from a disabling sensor 310, the disable module 302 may disable the alert, logging, and communication generated by the response module 206. A disabling sensor 310 may include an angle sensor coupled to a hinge on a laptop cover. In alternative embodiments, the disabling sensor 310 may include a switch, a button, a voice command receiver, or the like.

In one embodiment, the alert module 304 is configured to alert a user to the potential damage condition. The alert module 304 may generate an audible alarm used by a magnetic speaker, piezoelectric sound device, buzzer, or the like. In another embodiment, the alert module 304 may generate a user perceivable vibration. For example, the alert module 304 may include an electric motor with an angularly attached weight to generate a vibration.

In one embodiment, the logging module 306 is configured to store damage condition information in nonvolatile memory. The damage condition information may include the physical stress condition level detected by the sensor 104, a time stamp, the duration of the potential damage condition, response actions taken by the response module 206, and the like. The logging module 306 may communicate with the nonvolatile memory via a data bus.

In one embodiment, the communication module 308 is configured to communicate potential damage condition to a remote device. For example, the communication module 308 may communicate potential damage information to a remote database for use with warranty claims. The communication module 308 may communicate the data over an internet connection, telephone connection, wireless data connection, or the like. The communication module 308 may communicate the damage condition information immediately in response to the damage condition. Alternatively, the communication module 308 may delay communication of the damage condition information until the communication module 308 is connected to an internet connection or the like. In another embodiment, the communication module 308 may communicate potential damage information through an e-mail message, pager message, or telephone message to the user.

Figure 4:
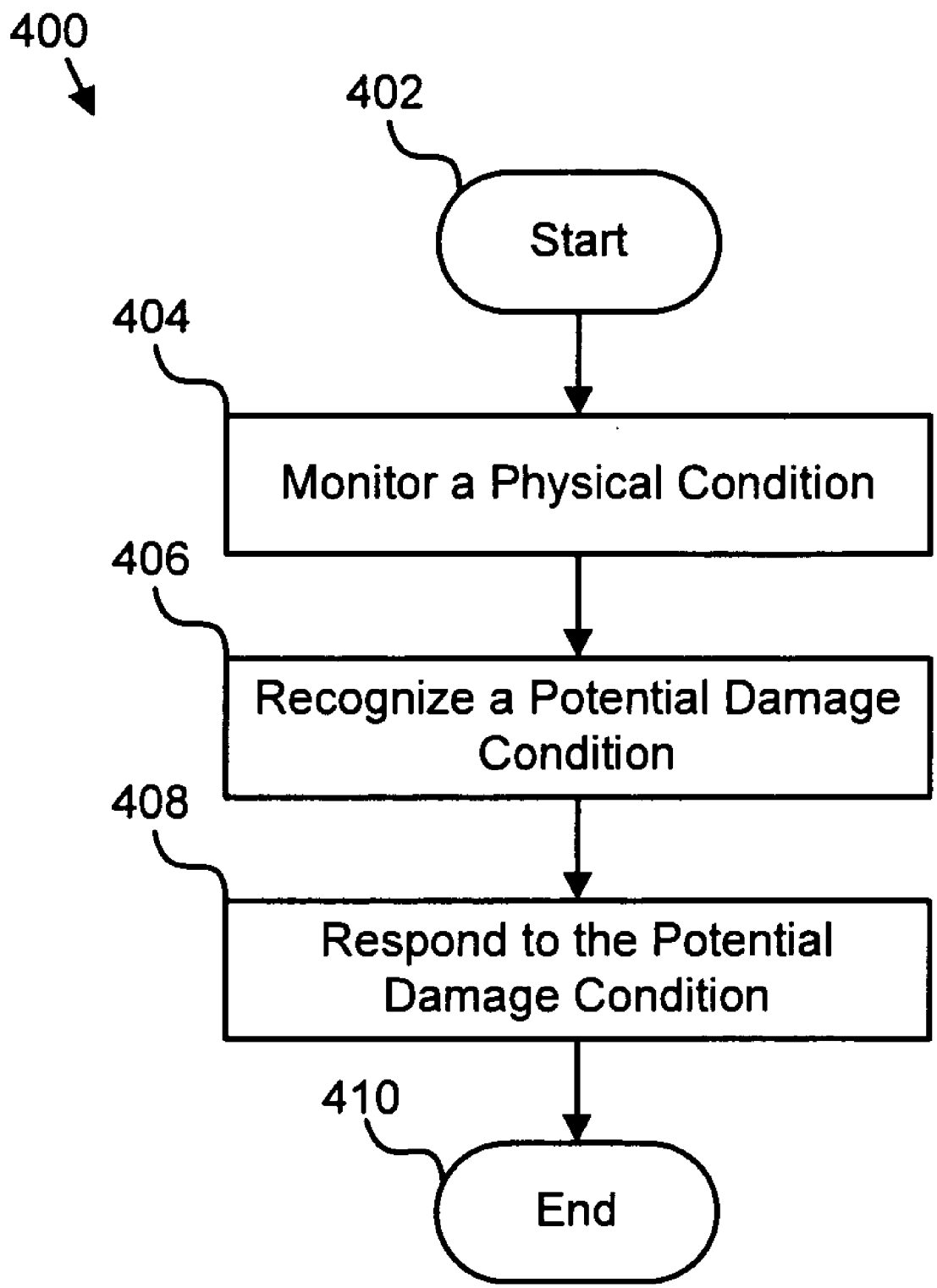
FIG. 4 is a schematic flow chart diagram illustrating one embodiment of a method for identifying structural stress conditions for computer hardware.

FIG. 4 illustrates one embodiment of a method 400 for identifying structural stress conditions for computer hardware. In one embodiment, the method 400 starts 402 when the monitoring module 202 monitors 404 a physical stress condition 106. The recognition module 204 may then recognize 406 a potential damage condition. The response module 206 may then respond 408 to the potential damage condition 408, and the method 400 ends 410. In another embodiment, the method 400 may not end 410. For example, the method 400 may continuously monitor 404 the physical stress condition 106 even after recognizing 406 and responding 408 to a potential damage condition.

Figure 5:
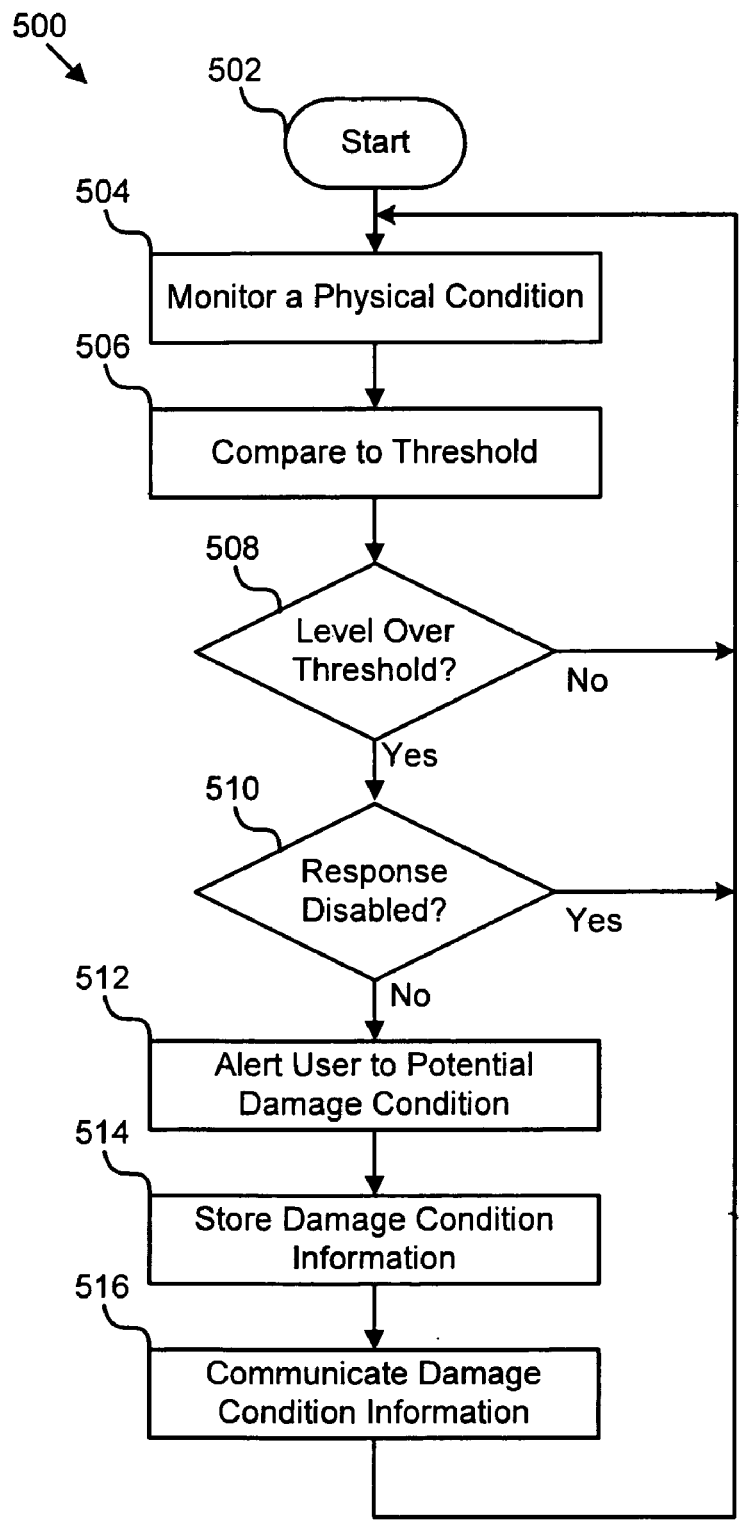
FIG. 5 is a detailed schematic flow chart diagram illustrating one embodiment of a method for identifying structural stress conditions for computer hardware.

FIG. 5 illustrates one embodiment of a detailed method 500 for identifying structural stress conditions for computer hardware. In one embodiment, the method 500 starts 502 when the monitoring module 202 monitors 502 a physical stress condition 106 affecting a computer hardware component 102. In one embodiment, the monitoring module 202 monitors 504 a signal generated by the sensor 104, and the recognition module 204 compares 506 the signal to a threshold. If the signal level is not 508 over the threshold level, the monitoring module 202 continues to monitor 504 the physical stress condition 106. If the signal level is 508 over the threshold level, a potential damage condition is recognized. If the response is disabled 510, the monitoring module 202 continues to monitor 504 the physical stress condition 106, but no further response is made by the response module 206. If the response is not disabled 510, the alert module 304 may alert 512 a user to the potential damage condition, the logging module 306 may store 514 damage condition information, and the communication module 308 may communicate 516 damage condition information to a remote device. The monitoring module 202 may then continue to monitor 504 the physical stress condition 106, and the method 500 repeats.

Figure 6:
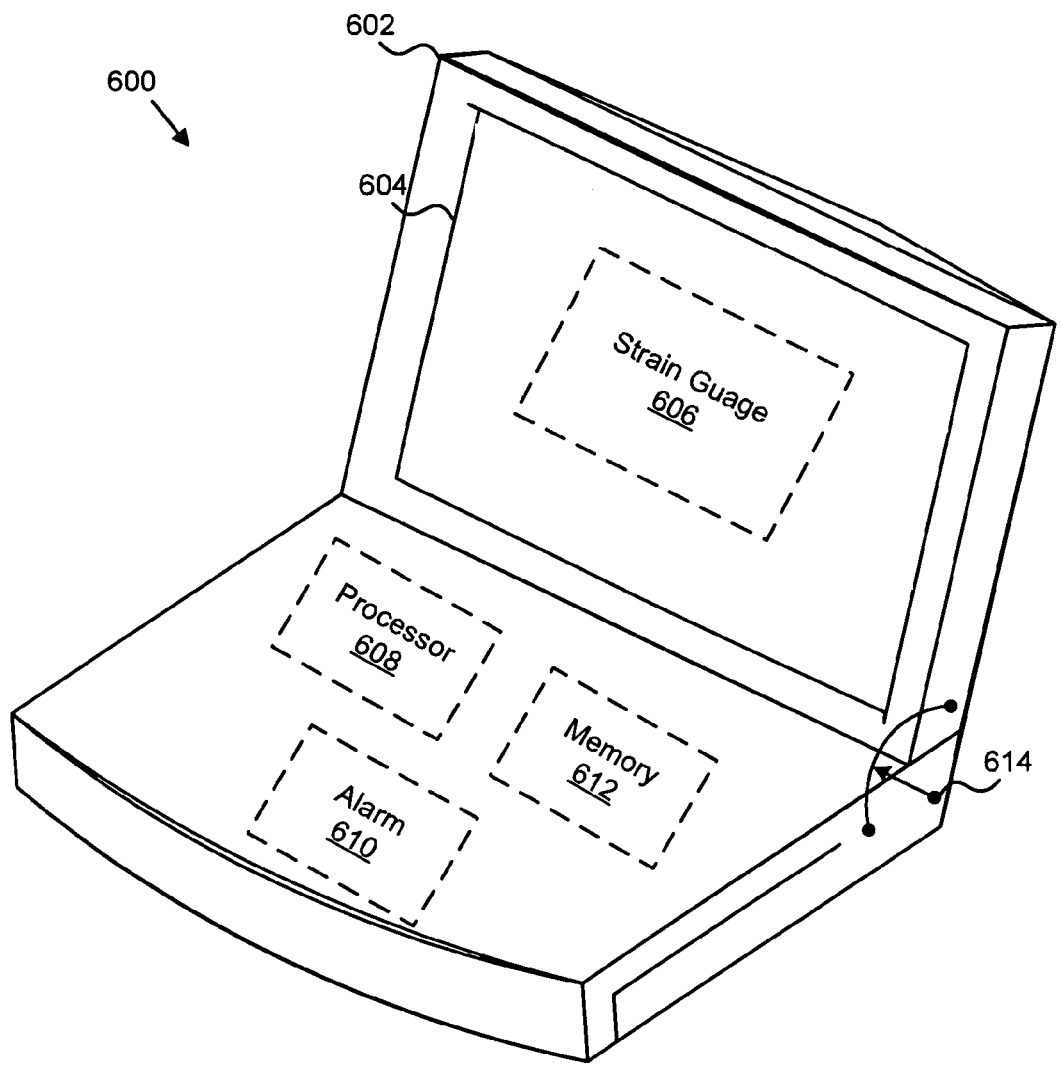
FIG. 6 is a schematic block diagram illustrating one embodiment of a system for identifying structural stress conditions for a laptop computer.

FIG. 6 illustrates one embodiment of a system 600 for identifying structural stress conditions for a laptop computer. The system 600 may include an LCD housing 602 with an attached LCD 604. A strain gauge 606 may be coupled to the inside surface of the LCD housing 602 between the LCD 604 and the LCD housing 602. The strain gauge 606 may be electrically coupled to the processor 608. In one embodiment, the strain gauge measures strain on the LCD housing 602. The processor 608 may compare the signal level generated by the strain gauge 606 to a threshold. If the stain on the LCD housing 602 crosses the threshold level, a potential damage condition is recognized by the processor 608.

If a potential damage condition is recognized, the processor 608 may trigger an alarm 610. In one embodiment, the alarm 610 may be an audible signal generated by a magnetic or piezoelectric speaker. In one embodiment, the alarm 610 may generate an audible signal with a fluctuating frequency. Alternatively, the alarm 610 may include a vibration generated by an angularly weighted motor or similar vibration producing apparatus.

Additionally, the processor 608 may store damage condition information in memory 612. In one embodiment, the memory 612 is nonvolatile. For example, the memory 612 may include a PROM, a continuously powered RAM, a flash memory, or the like. The damage condition information may include the strain level detected by the strain gauge 606, a time stamp, the duration of the potential damage condition, response actions taken by the processor 608, and the like.

In one embodiment, the system may include an angle sensor 614 coupled to a hinge on the LCD housing 602. The angle sensor 614 may be used to determine if the LCD housing 602 is being opened by a user. In one embodiment, the angle sensor 614 may serve as a disable sensor 310 configured to disable a response from the processor 608 while the LCD housing 602 is being opened by a user.

Figure 7:
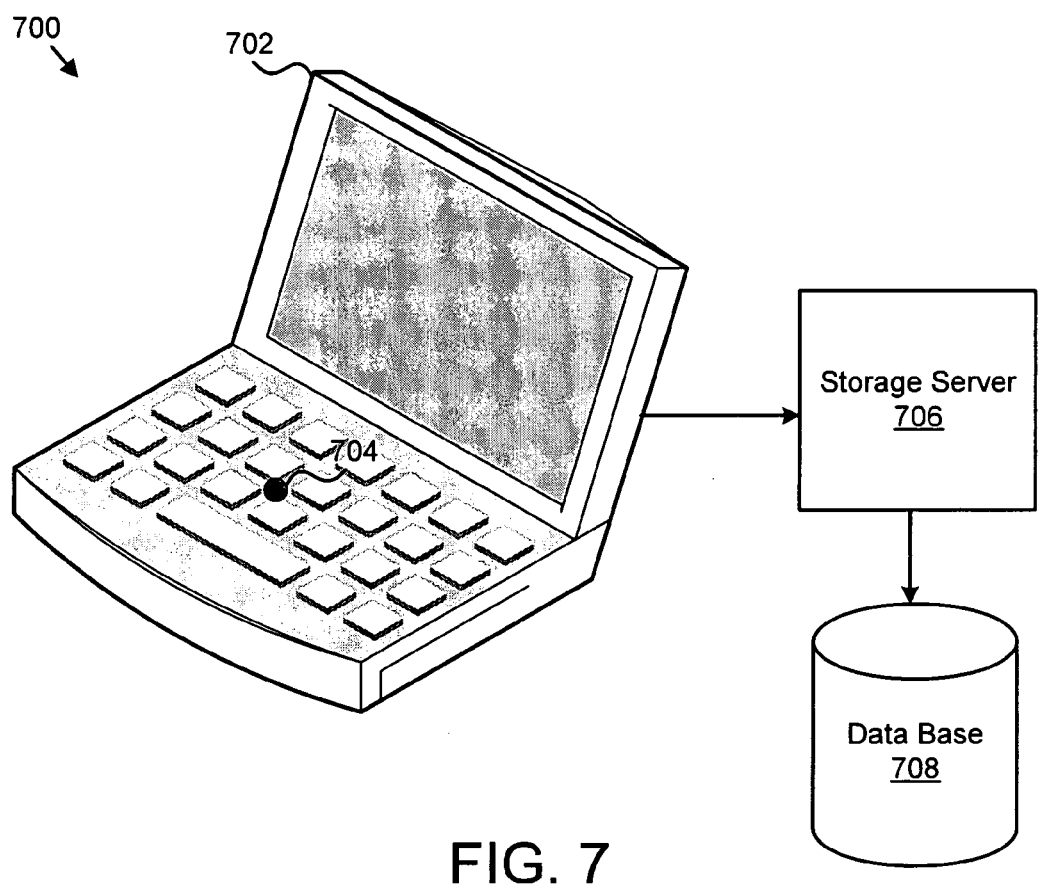
FIG. 7 is a schematic block diagram illustrating one embodiment of a system for identifying and communicating structural stress conditions for a laptop computer.

FIG. 7 illustrates one embodiment of a system 700 for identifying and communicating structural stress conditions for a laptop computer 702. The system 700 may include a laptop computer 702 and a pressure-sensitive pointer control device 704 coupled to the laptop computer. Additionally, the system 700 may include a storage server 706 and a database 708.

In one embodiment, the pressure-sensitive pointer control device 704 is an International Business Machines (IBM) Corporation TrackPoint □ mouse control device. In one embodiment, the pressure-sensitive pointer control device 704 may sense pressure applied to the cover of the laptop 602 when the cover is in closed position. If the LCD comes in contact with the pressure-sensitive pointer control device 704, the pressure-sensitive pointer control device 704, may act as a pressure sensor. In one embodiment, the pressure-sensitive pointer control device 704 may be coupled to an apparatus 300 and serve as a sensor 104 for identifying structural stress conditions for computer hardware.

In one embodiment, the apparatus 300 may detect a potential damage condition. Then the communication module 308 of the apparatus 300 may communicate the damage condition information to a remote storage server 706. The remote storage server 706 may then store the damage condition information in a database 708. In one embodiment, the potential damage condition information stored in the database 708 may be used to support or verify warranty claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for identifying structural stress conditions for computer hardware, the apparatus comprising:
a monitoring module configured to monitor a physical stress condition affecting a liquid crystal display (LCD) housing;
a recognition module configured to recognize a potential damage condition based on a threshold; and
a response module configured to respond to the potential damage condition, the response module comprising an alert module configured to alert a user to the potential damage condition.

2. The apparatus of claim 1, wherein the monitoring module is further configured to monitor a signal from a sensor selected from a group consisting of a pressure sensor, a stress sensor, a strain gauge, a torsion sensor, a puncture sensor, an angle sensor, an accelerometer, a temperature sensor, and a humidity sensor.

3. The apparatus of claim 1, wherein the monitoring module is further configured to monitor a signal from a pressure-sensitive pointer control device coupled to a laptop computer.

4. The apparatus of claim 1, wherein the recognition module further comprises a disable module configured to temporarily disable the response module while the LCD housing is opened by the user.

5. The apparatus of claim 1, wherein the response module further comprises a logging module configured to store damage condition information.

6. The apparatus of claim 1, wherein the response module further comprises a communication module configured to communicate damage condition information to a remote device.

7. A system for identifying structural stress conditions for computer hardware, the system comprising:
a portable computing device configured with a LCD housing to be monitored;
a sensor configured to sense a physical stress condition affecting the LCD housing; and
a processor configured to,
monitor the physical stress condition affecting the LCD housing;
recognize a potential damage condition based on a threshold; and
respond to the potential damage condition by alerting a user to the potential damage condition.

8. The system of claim 7, wherein the sensor is selected from a group consisting of a pressure sensor, a stress sensor, a strain gauge, a torsion sensor, a puncture sensor, an angle sensor, an accelerometer, a temperature sensor, and a humidity sensor.

9. The system of claim 7, wherein the processor is continuously powered.

10. The system of claim 7, wherein the processor is further configured to monitor a plurality of sensor signals.

11. The system of claim 7, wherein the processor is further configured to store damage condition information in nonvolatile memory.

12. The system of claim 7, wherein the processor is further configured to communicate damage condition information to a remote data repository.

13. A method for identifying structural stress conditions for computer hardware, the method comprising:
monitoring a physical stress condition affecting a LCD housing;
recognizing a potential damage condition based on a threshold; and
responding to the potential damage condition by alerting a user to the potential damage condition.

14. The method of claim 13, further comprising monitoring a plurality of sensor signals.

15. The method of claim 13, further comprising temporarily disabling a response to the potential damage condition while the LCD housing is opened by a user.

16. The method of claim 13, further comprising logging damage condition information.

17. The method of claim 13, further comprising communicating damage condition information to a remote device.

18. A signal bearing medium tangibly embodying a program of machine-readable instructions executable by a digital processing apparatus to perform operations for identifying structural stress conditions for computer hardware, the operations comprising:

an operation to monitor a physical stress condition affecting a LCD housing;

an operation to recognize a potential damage condition based on a threshold; and an operation to respond to the potential damage condition by alerting a user to the potential damage condition.

19. The signal bearing medium of claim 18, further comprising an operation to log damage condition information.

20. An apparatus for identifying structural stress conditions for computer hardware, the apparatus comprising:

a monitoring module configured to monitor a strain gauge coupled to a LCD housing;

a recognition module configured to recognize a potential structural damage condition based on a threshold; and a response module configured to generate at least one response to the potential damage condition, wherein the response consists of initiating a user-perceivable alert, logging of damage condition information, and remotely communicating damage condition information.

21. The apparatus of claim 20, wherein the monitoring module is further configured to monitor a plurality of sensor signals.

22. The apparatus of claim 20, wherein the response module is further configured to store potential damage information in nonvolatile memory.

23. The apparatus of claim 1, wherein the physical stress condition is a force level that imposes a physical stress on the LCD housing.

* * * * *